United States Patent [19]
Eriksson

[11] Patent Number: 5,804,069
[45] Date of Patent: Sep. 8, 1998

[54] APPARATUS FOR EXTRACTING WATER FROM MARINE SEDIMENTS

[76] Inventor: Lars Leander Eriksson, 108 Bedford St., Port Hope, Ontario, Canada, L1A 1W6

[21] Appl. No.: 663,549

[22] Filed: Jun. 13, 1996

Related U.S. Application Data

[62] Division of Ser. No. 541,820, Oct. 10, 1995, Pat. No. 5,558,779.

[51] Int. Cl.$^6$ .................................................. B01D 35/00
[52] U.S. Cl. .......................... 210/248; 210/455; 210/483; 210/485; 210/774; 37/195; 37/307; 405/130; 405/303
[58] Field of Search ..................................... 210/175, 248, 210/455, 483, 485, 774; 37/195, 307; 405/130, 303

[56] References Cited

U.S. PATENT DOCUMENTS

| | | | |
|---|---|---|---|
| 3,580,479 | 5/1971 | Weiss . | |
| 5,636,457 | 6/1997 | Eriksson | 210/774 |
| 5,660,055 | 8/1997 | Eriksson | 210/774 |

FOREIGN PATENT DOCUMENTS

| | | | |
|---|---|---|---|
| 5000479 | 9/1994 | European Pat. Off. | A47L 13/58 |
| 647942 | 1/1937 | Germany | 16/11 |

OTHER PUBLICATIONS

"Application of the Freeze/Thaw Dewatering Technique in Hazardous Waste Material" by Joseph F. Selann (undated).
"Assessment and Remediation of Contaminated Sediments (ARCS) Program, (Remediation Guidance Document)", United States Enviornmental Protection Agency, Oct. 1994.

*Primary Examiner*—Robert Popovics
*Attorney, Agent, or Firm*—Edward M. Livingston, Esq.

[57] ABSTRACT

A mesh enclosed container is provided to remove melt water from frozen blocks of contaminated sediment which has been extracted from a marine environment. The mesh enclosure has a number of porous wicking tubes for insertion into corresponding cavities in the frozen sediment blocks. Wicking material is inserted into the tubes to enhance melt water flow out of the sediment blocks during the thawing cycle. A sealed container may be provided to enclose the block and meshed container to prevent escape of volatile materials during the thawing cycle. The sealed container will also collect melt water accumulated during the thawing cycle. A method of melting frozen marine sediment blocks is provided to recover treated water.

20 Claims, 5 Drawing Sheets

APPARATUS FOR EXTRACTING WATER FROM MARINE SEDIMENTS

This is a division of application Ser. No. 08/541,820, filed on Oct. 10, 1995 now U.S. Pat. No. 5,558,779.

The present invention relates to an apparatus and a method for extracting melt water from frozen blocks of sediment removed from marine environments including the beds of rivers, streams, lakes, marshes or other marine environments.

Sediment extraction is becoming increasingly more important to remove toxic and other deleterious substances from marine environments. In many instances, substantial deposits of contaminated marine sediment beds have either gone undetected or have been identified but could not be removed or treated effectively without contaminating nearby water bodies. The solidification of water soaked marine sediments through freezing provides an improved mechanism for extraction and subsequent treatment of the sedimentary and aqueous components of the extracted sediment.

Some attempts have been made to utilize freezing devices to excavate land based soil deposits. U.S. Pat. No. 1,704,577 to Pomykala issued on Mar. 5, 1929 discloses the use of a refrigeration device to create an excavation barrier. The device is fixed in target soil of a land based excavation site. Using the device, the target soil is then frozen to form a solid barrier or excavation wall to prevent collapse of surrounding soil into the trench or pit to be excavated within the frozen barrier wall. That is, unfrozen soil is excavated whereas the frozen soil is to be left behind after the excavation is completed.

German patent application DE 38 17 691 A1, (Dyckerhoff & Widmann AG), disclosed on Nov. 30, 1989 and European patent application 89118525.8, (Linde Corporation), published on Apr. 11, 1990 relate to devices for removing soil from land based sites such as solid waste dump sites and other contaminated soils. However, the noted applications and the United States patent to Pomykala do not provide a method or apparatus to extract water from marine based sediments.

The sediment removal system disclosed in Japanese patent application 61-21235 (A), (Fujita Kogyo K. K.), advertised on Jan. 29, 1986, does not teach a method or apparatus for removing water from frozen sediment blocks which may be extracted from a marine environment. Furthermore, this reference requires the cutting of frozen sediment block into smaller portions in order to enable extraction of the frozen sediment from the marine environment. This and other required steps add to the disturbance of unexcavated marine sediments and surrounding free water formations.

The present invention is particularly well adapted for use in connection with sediment blocks formed by using the applicant's method and apparatus disclosed in applicant's copending U.S. patent application Ser. No. 08/356,687 filed on Dec. 15, 1994. The applicant's prior patent application describes an apparatus and method for extracting sediments from marine environments. Sediment blocks are formed during the freezing cycle so that the blocks of sediment detachably engage with elongated elements of the freezing apparatus. Upon detachment of the sediment blocks from the apparatus, frozen sediment blocks are provided with cavities left as impressions of the extracted freezing elements. The apparatus and method of the above mentioned invention may be practiced to generate numerous substantially identical sediment blocks which can then be treated in substantially identical apparatuses of the present invention.

It is to be understood that blocks of marine sediment suitable for treatment with the apparatus and method of the present invention may be frozen at locations remote from the marine source. Furthermore, blocks of frozen marine sediment may be made by using various other methods and equipment.

The use of freezing and thawing techniques to extract sediments and entrained water from marine environments provides a number of advantages, including those identified in the applicant's copending United States patent application identified above. The noted invention teaches a method and apparatus for generating a multiplicity of substantially uniform blocks formed by a number of similar freezing cells. Upon removal of the frozen sediment blocks from the marine environment, relatively little water disturbance and contamination is generated in comparison to sediment extraction techniques of the prior art. It is also to be noted that during the freezing cycle, the formation of ice crystals within the water soaked marine sediment tends to expel nonaqueous molecules from the ice crystal structure being formed during the freezing cycle. The present invention is well suited to extract purified water components which have been generated during the freezing and removal stages.

Sediment blocks generated by freezing marine sediments may then be transported to remote sites for treatment under controlled conditions. For example, the blocks may be transported in refrigerated and insulated containers and subsequently the blocks may be placed into the apparatus of the present invention. However, in many instances, it will be advantageous to utilize embodiments of the present invention during the transportation and storage of frozen sediment if a substantial portion of the sediment block would otherwise be thawed during the initial material handling stages.

The present invention provides an apparatus for enhancing the extraction of melt water from frozen sediment blocks during the thawing cycle. The apparatus comprises a porous enclosure for containment of a frozen sediment block. In one embodiment, the enclosure comprises a porous first surface and an optional second surface which is substantially parallel to the first surface. Wicking means are provided to enhance extraction of melt water from the sediment block during the thawing cycle. Preferably, the wicking means are positioned adjacent to the porous surface. Means are also provided to remove water away from the wicking means.

In another embodiment of the present invention, the porous enclosure includes elongated members which are adapted to engage with corresponding cavities formed in the sediment block during the freezing/extraction cycle. Preferably, the elongated members are substantially porous to enhance extraction of melt water from the melting block. The elongated members may be reinforced to inhibit the collapse of the thawing sediment into the cavities during the thawing cycle. Wicking material may be extended into the elongated members to further enhance the extraction of melt water.

In a preferred embodiment of the present invention, the enclosure is substantially a fine mesh cage of substantially the same size as the sediment block. The cage is adapted to position the sediment block in a location which is substantially centered within the cage. The mesh cage is provided with integral elongated mesh members which engage with cavities in the frozen sediment block. The apparatus is provided with wicking material which is positioned so that the mesh is intermediate of the sediment and the wicking material. (In other embodiments of the present invention, wicking material may be place in direct contact with the frozen sediment block. Additional wicking material may be placed exterior of the mesh enclosure to enhance melt water extraction.) The mesh enclosure may be positioned so that the surfaces of the sediment block are inclined to the horizontal. Additional wicking material may be provided adjacent to the other inclined surfaces of the frozen sediment block to promote water extraction. The wicking material is oriented to enhance the flow of melt water through gravitational forces.

In a further embodiment of the invention, the apparatus includes a sealed container which is capable of collecting fluids released during the thawing cycle of the sediment block. Melt water flows away from the sediment and is collected in a reservoir or basin formed between the porous floor of the mesh cage and the bottom of the sealed container. The sealed container may also be insulated to prevent uncontrolled thawing during transportation or temporary storage pending thawing under controlled conditions.

The present invention also provides a method for extracting melt water from a frozen sediment block taken from a marine environment. The method comprises the step of engaging a frozen sediment block having one or more cavities with wicking means is adjacent with at least one surface of the sediment block; positioning the block within a porous enclosure; and removing the melt water to a location remote from the sediment.

In another embodiment of the present invention, the method comprises the step of engaging the wicking means with the cavities formed within the sediment block. The wicking means are positioned substantially downwardly to enhance the extraction of melt water by action of gravity.

In another embodiment of the present invention, the method comprises the step of collecting the melt water generated by the thawing of the sediment block. A step involving the analysis of melt water production may be added to monitor the suitability of the water for further treatment or release into the environment. The sediment block may be inclined to encourage run off of melt water from substantially all of the surfaces of the sediment block and the porous cage.

In yet another embodiment of the invention, additional separation of melt water from deleterious contaminants is accomplished by an evaporation step. Evaporating water is thereby released to the atmosphere whereas contaminated melt water is concentrated within a pond. Accumulated solids in the pond may then be consolidated with other contaminated sediment material remaining after melting numerous sediment blocks for further treatment prior to disposal.

Drawings are attached hereto as illustrations of some embodiments of the present invention.

FIG. 3 shows two identical embodiments, where the two embodiments are resting on opposite bottom and top surfaces, respectively.

Figure 1:
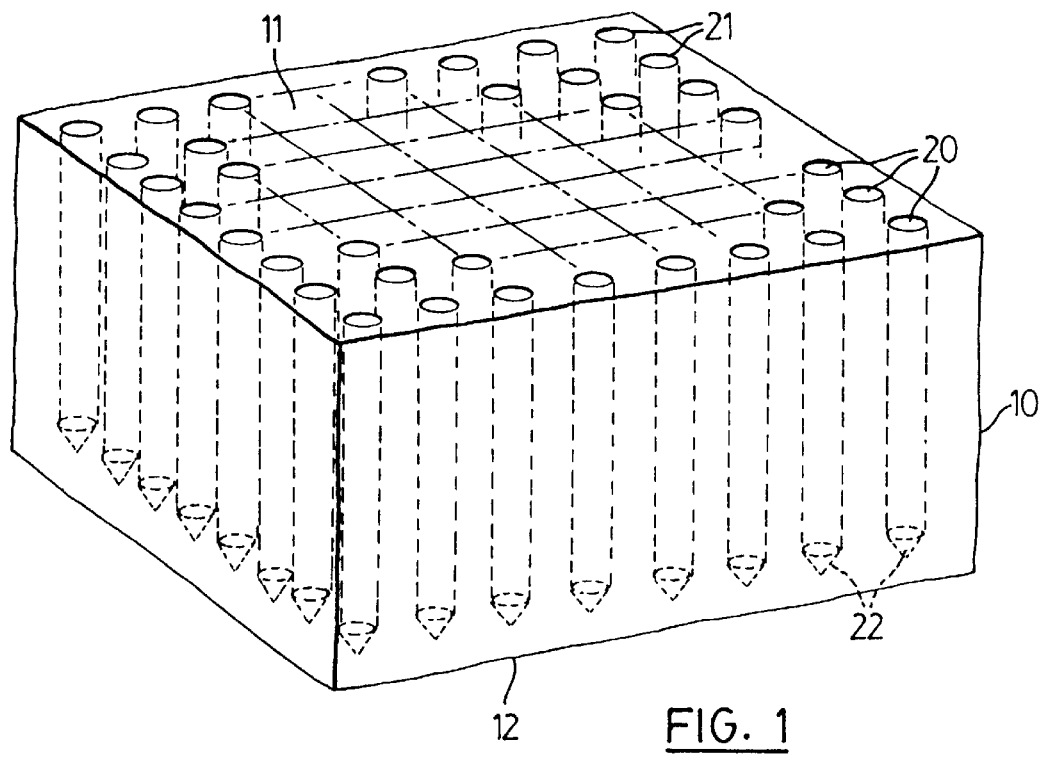
FIG. 1 is a perspective view of a frozen sediment block of substantially rectangular configuration when viewed in cross section.

With reference to the appended drawings, FIG. 1 shows a block 10 of frozen sediment which has been extracted from a marine environment. The block 10 is provided with a symmetrical array of cavities formed by the tines of a freezing cell when immersed into the sediment bed prior to freezing. Embodiments of freezing apparatuses shown in applicant's United States copending patent application are examples of freezing cells which would leave cavities in frozen sediment blocks. The cavities are exposed after disengagement of the freezing tine members (not shown) of those freezing cells from the blocks formed during the freezing cycle. Preferably, the cavities are symmetrically arranged to simplify engagement of the frozen block with an apparatus of the present invention. The top surface 11 of block 10 defines a number of cavity openings 21. The cavities 20 are generally cylindrical in cross section and terminate internally of the block at terminal cavity ends 22.

The block 10 may be disengaged from a freezing cell (not shown) by warming the sediment immediately adjacent the freezing tines and other portions of the freezing cell which are engaged with the block. To simplify release of the block and the subsequent engagement of the block with the apparatus of the present invention, it is preferred that the block be placed on a porous surface such as a mesh bottom plate (not shown). However, a bottom plate may not be required where the block is promptly engaged with the device of the present invention and then subsequently turned over as described further below.

Figure 2:
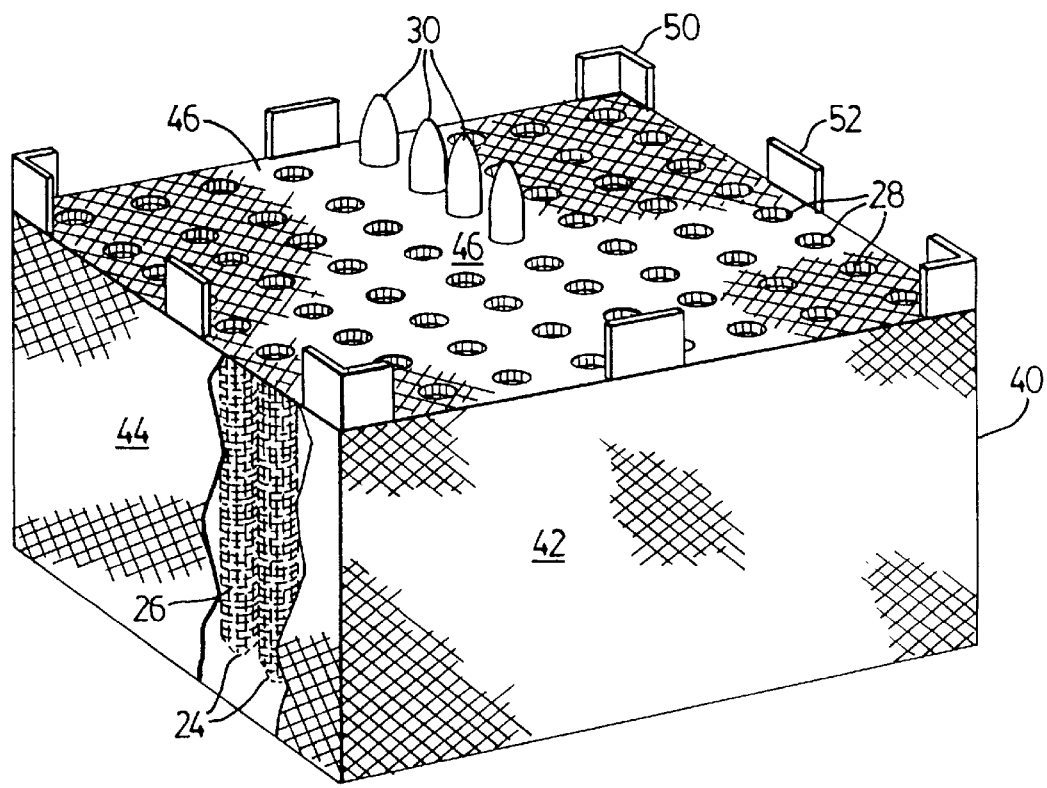
FIG. 2 is a perspective and partial sectional view of one embodiment of the present invention which is a porous enclosure for the sediment block shown in FIG. 1.

After placement of the block on the mesh bottom plate (where such a plate is provided), the block is then covered by a mesh cage enclosure 40 shown in FIG. 2. Preferably all of the walls 42, 44, and surface plate 46 of the cage 40 are made of a substantially rigid porous material. A reinforced mesh having pores in the range of 35 to 70 microns is preferred for most marine sediment treatments. However, it will be readily understood by those skilled in the art that other materials may be used. It may be necessary to vary the pore size to accommodate the specific characteristics of certain extracted marine sediments. Pore sizes and the type of porous material used may be varied where particularly fine or coarse sediments are encountered. Similarly, the porous mesh of the cage 40 (and a bottom plate, if provided) may require additional reinforcement to prevent distortion or collapse of the cage when supporting the substantial initial weight of the sediment block. A rigid reinforcing frame or other means may be provided to reinforce the porous components of the cage (and the bottom plate, if the latter is also provided).

With reference to FIG. 2, cage 40 is also provided with corner support legs 50 and central supports 52 located along the outer periphery of surface plate 46 of the cage. The cage is also provided with a multiplicity of elongated porous members (or wicking tubes) 26 which are designed to engage with corresponding cavities 20 of the block 10. The ends 24 of the wicking tubes 26 terminate near the terminal ends 22 of the cavities 20. The wicking members 26 are all hollow. Openings 28 provide access to the hollow interiors of the wicking tubes 26. The wicking tubes or members are preferably secured to the surface plate 46 of the cage. However, the member 26 may be constructed to be detachable from the cage to simplify cleaning or other maintenance tasks. In those cases, the detachable members 26 may be secured to the surface plate 46 after insertion of the members into the corresponding cavities 20 of the block. For example, a snap in means of securement may be provided, although the exact nature of the securement means is not an essential feature of this invention.

It is also to be understood that it is not necessary to have as many elongated members 26 as there may be of corresponding cavities 20 in the frozen sediment block. However, the elongated members will be arranged in a pattern substantially corresponding to the pattern defined by the freezing tines of the freezing cell used initially to form and extract the sediment from the marine environment. It will therefore be understood that the size (and general shape) of the porous elongated members 26 will be slightly smaller than the size (and general shape) of the cavities 20.

Wicks 30 are shown inserted into the wicking tubes 26. The wicks 30 may be made of fibrous material, including newspapers, cotton cloth, or synthetically prepared materials containing generally capillary type fibers. The construction and composition of the wicks 30 and other wicking material to be used will depend upon a number of factors, including the physical characteristics of the sedimentary material under consideration for treatment. Although it is not essential to the present invention, it is preferred that wicks be inserted into each of the wicking tubes 26.

In other embodiments of the present invention which are not shown, it may be desirable to introduce additional wicking material adjacent to the porous mesh surfaces of the cage, namely walls 42, 44 and the like to enhance melt water flow away from the contained sedimentary materials. The additional wicking material may be configured in suitable sheets (not shown) placed adjacent to the mesh walls. The wicking sheet material may also be provided with numerous protrusions or drip points to encourage the formation of water droplets capable of falling away from the remaining sedimentary material.

The wicks 30 are shown extending outwardly of the surface plate 46 despite having been fully inserted into the wicking tubes 26. The wicks 30 are slightly longer than the wicking tubes to promote water extraction from the sediment block during thawing. The wicks may be provided with features to snugly secure them within the wicking tubes during the thawing stage. It is also preferable that the wicking tubes not extend as far beyond surface plate 46 as support legs 50 and 52 so as to provide a drip space as disclosed further below.

Figure 3:
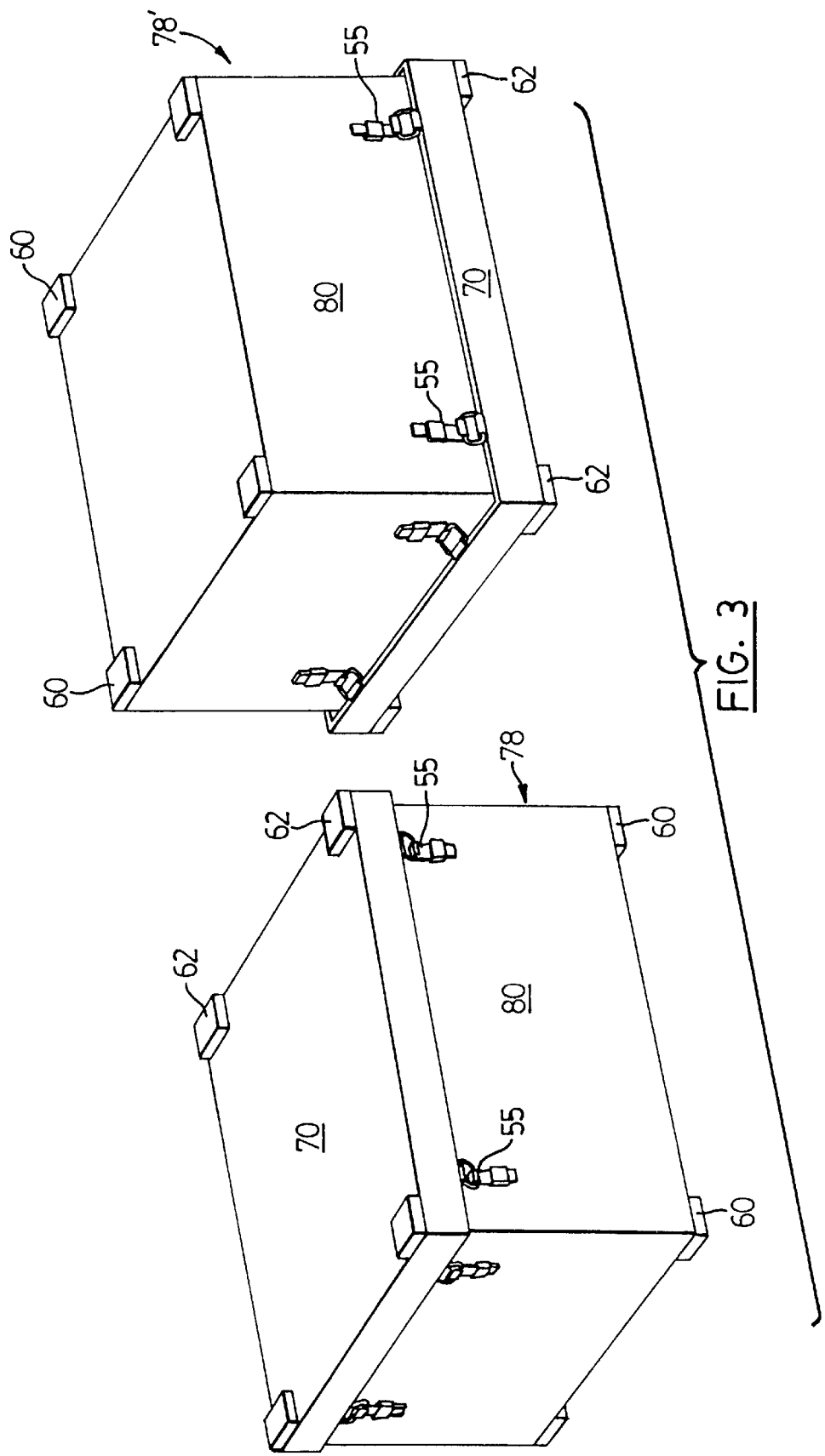
FIG. 3 is a perspective view of an embodiment of the present invention for containing the porous enclosure and sediment block of FIGS. 1 and 2.

According to the preferred embodiment of the present invention, the porous enclosure or cage 40 may be turned over or inverted such that surface 46 defines the floor of the cage upon which the block will rest during the thawing stage. More particularly and with reference to FIGS. 3 and 4, another embodiment of the present invention is shown with a substantially enclosed container 78 made up of a lid or tray 70 fastened to a main body 80 by means of clasps 55 or other suitable means. The collection container 78 may be used during the shipping and storage stages of the removal, shipping and thawing processes.

Figure 4:
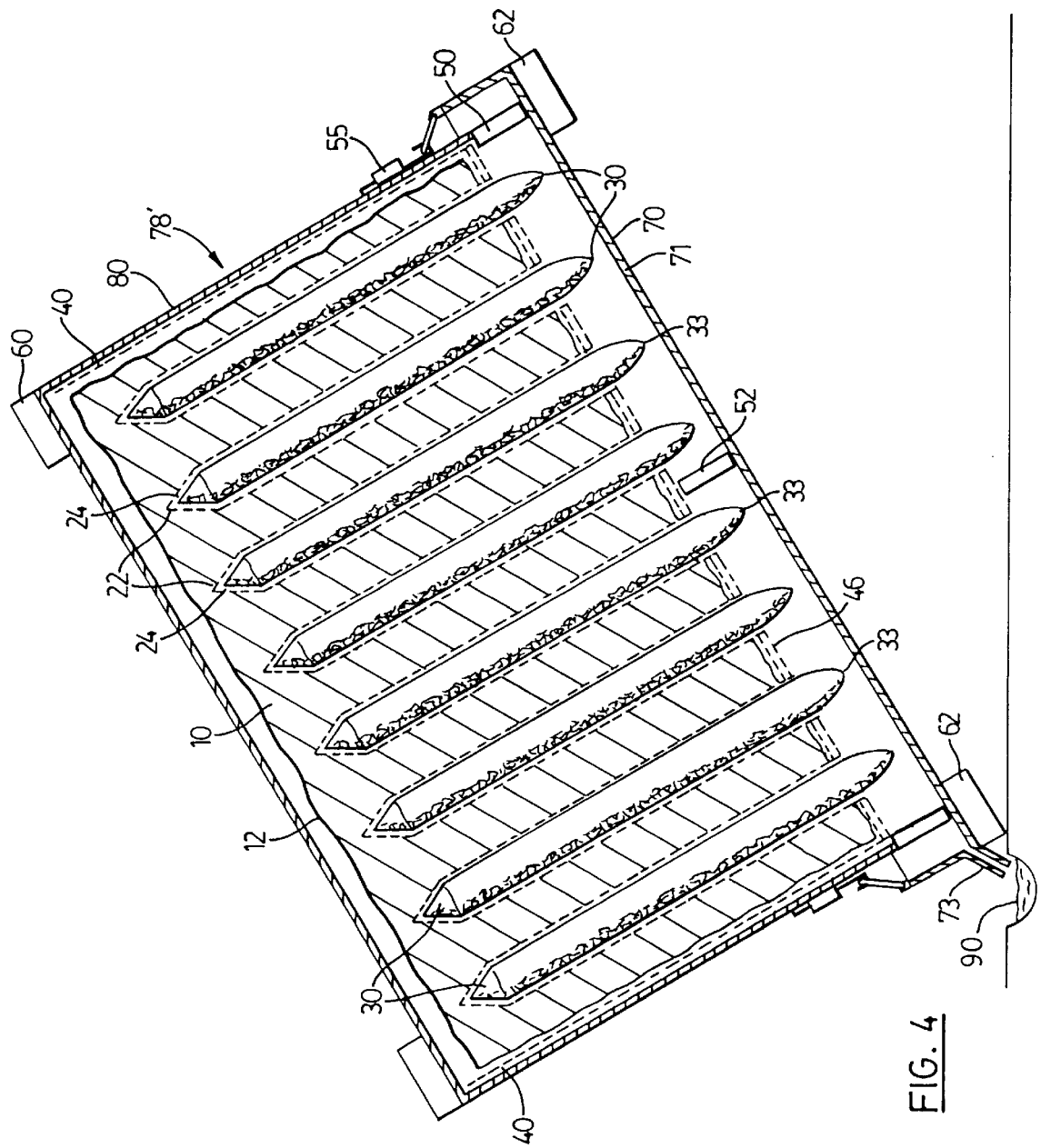
FIG. 4 is a sectional view of one embodiment of the present invention, namely the right hand most embodiment shown in FIG. 3.
Figure 5:
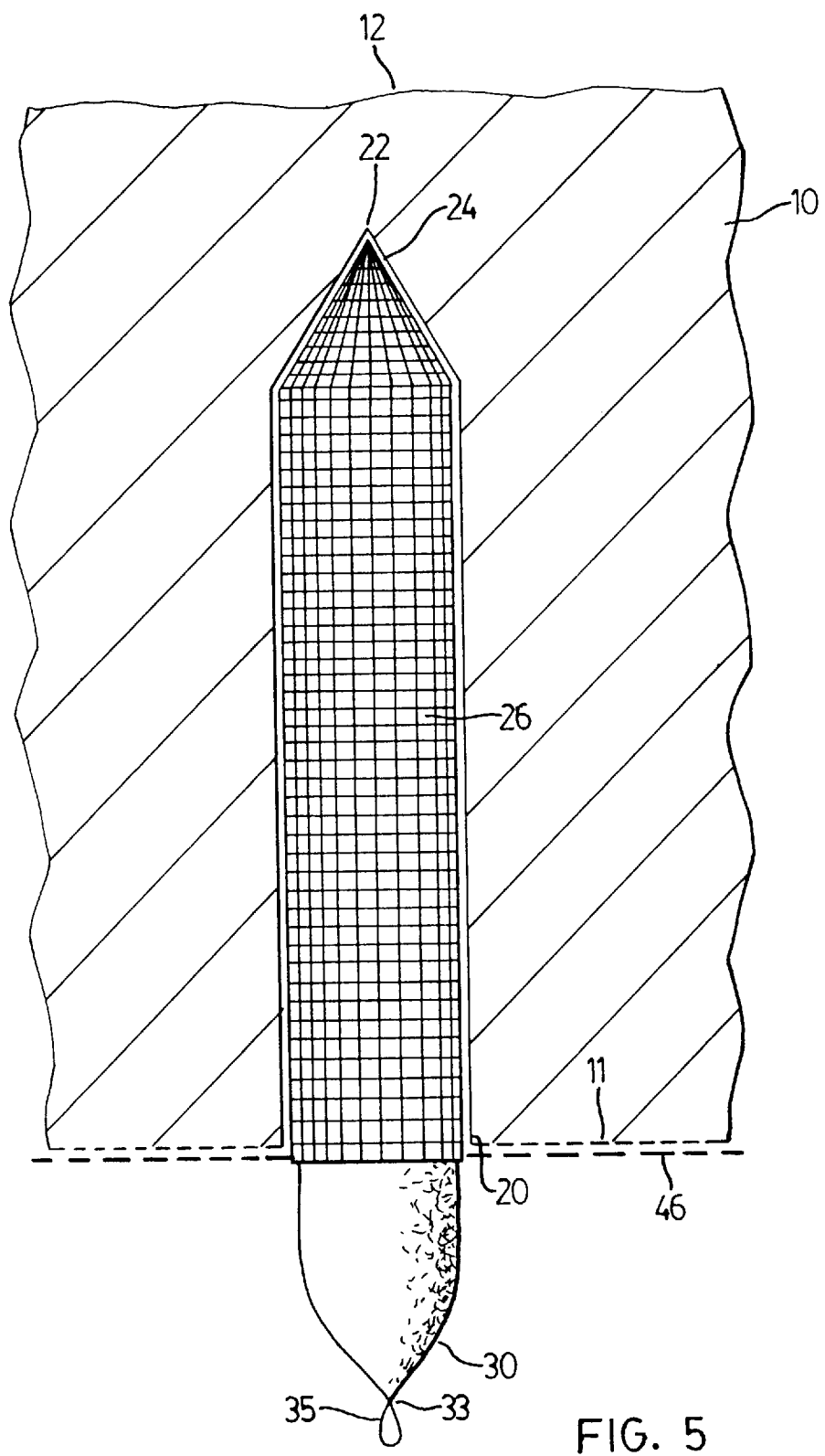
FIG. 5 is an enlarged partial sectional view of one embodiment of the present invention shown in FIG. 4.

By way of example, the addition of enclosed container 78 may be desirable where significant melting may occur during transportation to a remote treatment site. Prior to shipping, the main body 80 may be placed on a loading surface, supported by legs 60. Preferably, the container will be slightly larger than the sediment block 10. The sediment block 10 may be introduced into a centered location within the interior of the body 80, after which the cage 40 and wicking materials 30 may be engaged with the block. All of the contents will be positioned within the interior of the bottom portion 80 of the container 78. The lid or tray 70 may then be fastened to the bottom 80 by means of fasteners 55. After securing the tray and bottom portions, the container and contents may be turned over so that the outwardly projecting portions of the wicks point generally downwardly as shown in FIGS. 4 and 5. Upon inversion, the tray 70 will become the bottom of container 78.

Tray 70 may be designed to form a collection reservoir or a run off surface to channel to a drainage spout 73 as shown in FIG. 4. In some instances, it may be desirable to have an air tight or fully sealed chamber for transportation or thawing procedures, especially if hazardous volatile components may be released during the thawing process. In that case, the containers may be vented after delivery to a suitable treatment site without releasing any hazardous substances during transportation.

With reference to FIG. 5, a partial section of a sediment block 10 and surface plate 46 shows the plate 46 now acting as a floor supporting the sediment block. Although fully inserted into the corresponding wicking tube 26, portion 33 of the wick 30 nonetheless extends beyond the plate 46. When pointing in the generally downward direction, the melt water flowing from within the sediment block will tend to form water droplets 35 at tip 33 of the wicks. Water droplets will eventually fall from wick ends 33 to a collection or channeling surface below the wicking material. With reference again to FIG. 4, the container 78 and the contained block 10 and enclosure 40 may be inclined to encourage the flow of melt water to a drain spout 73 and in turn to a collection drain 90. Melt water will tend to channel downwardly along the lower edge of the wicks until the water reaches the wick ends 33. Melt water will form droplets of water at terminal ends 33 of the wicks 30. Legs 50 and 52 support the cage 40 so that the terminal ends 33 of the wicks 30 are suspended above interior surface 71 of tray 70. By inclining the device and contained sediment block as shown in this drawing, melt water will be encouraged to drain downwardly along surface 71 and from all of the surfaces of the block during the thawing process. In some instances where the block may be stored in a generally horizontal orientation, some melt water may tend to pool on the top surface 12 of the sediment block10. Other means may be provided to incline the surfaces of the block during containment within the enclosure 40.

In yet other embodiments of the present invention where the entire container and contents will not be inclined as shown in FIG. 5, the interior surface 71 of tray 70 may be slanted or offset from the horizontal to channel melt water toward a drain or other collection point.

The apparatus and the contained sediment block should not be disturbed to any significant extent during the thawing process. During the initial freezing process to transform marine sediment into a substantially solid block, the remaining water in the block expands upon freezing thereby increasing the extent of separation between nearby sediment particles. The freezing of that remaining water into ice results in about a 10 per cent expansion in the volume occupied by that water. The formation of ice crystals also tends to drive impurities out of the forming ice crystal structure. During the thawing stage, the melt water returns to its initial lower volume state. It is desirable to preserve the expanded channels initially formed between nearby sediment particles in order to enhance the ability of the melt water to flow out from between the sediment particles. Excessive vibrations or other disturbances during thawing will tend to cause the nearby sediment particles to collapse into the expanded voids formed during the freezing cycle. The collapse of sedimentary particles into those voids will tend to inhibit the flow of melt water and will enhance the reabsorption of melt water into the sediment material.

According to the present invention, a method is provided for enhancing removal of melt water away from melting blocks containing marine sediment. The method involves engaging a block of frozen sedimentary material with wicking means which are external of the sediment block. The sediment block has at least one cavity which is vented to the outside of the block. The wicking means are placed on at least one surface of the block, adjacent to the external port of the cavity. The frozen block is then placed into a porous chamber or enclosure to maintain the overall configuration of the sediment block and minimize disturbances of the sedimentary material during the thawing process. (Alternatively, the order of the two steps mentioned above may be reversed and such order is not an essential feature of this invention.) Once the thawing process begins, the melt water is removed away from the remaining sediment material to a remote location. The melt water is removed away from the remaining sediment to inhibit the reabsorption or retention of melt water within the sediment.

If hazardous volatile materials are present in the chamber during or after thawing of the sediment block, the volatile components may be evacuated by purging the chamber with inert gas such as nitrogen and subsequently collecting the hazardous volatile materials.

Wicking means may be introduced into the one or more internal cavities of the sediment block to enhance outward flow of melt water. Either before, after or during the introduction of the wicking means, additional support means may be introduced into the cavities to inhibit collapse of sedimentary materials into the cavities.

Melt water is collected for further treatment or release to the environment provided, in the latter instances, the melt water meets established water quality standards. To ensure that the melt water is correctly handled, melt water released from the thawing sediment may be collected. Thereafter, the melt water flowing from the sediment may be monitored and tested on a regular basis, as required. The decision whether to expose the melt water to further treatment or release the melt water will depend on a comparison of the level of detected contaminants in the melt water with the prescribed standards for those contaminants. Provided the level of contamination is less than the prescribed limits, the melt water should be satisfactory for release to the environment.

The flow of melt water away from a block of frozen sediment will usually be enhanced by inclining the block, and in turn its surfaces, to discourage pooling of melt water on exterior surfaces of the block.

Figure 6:
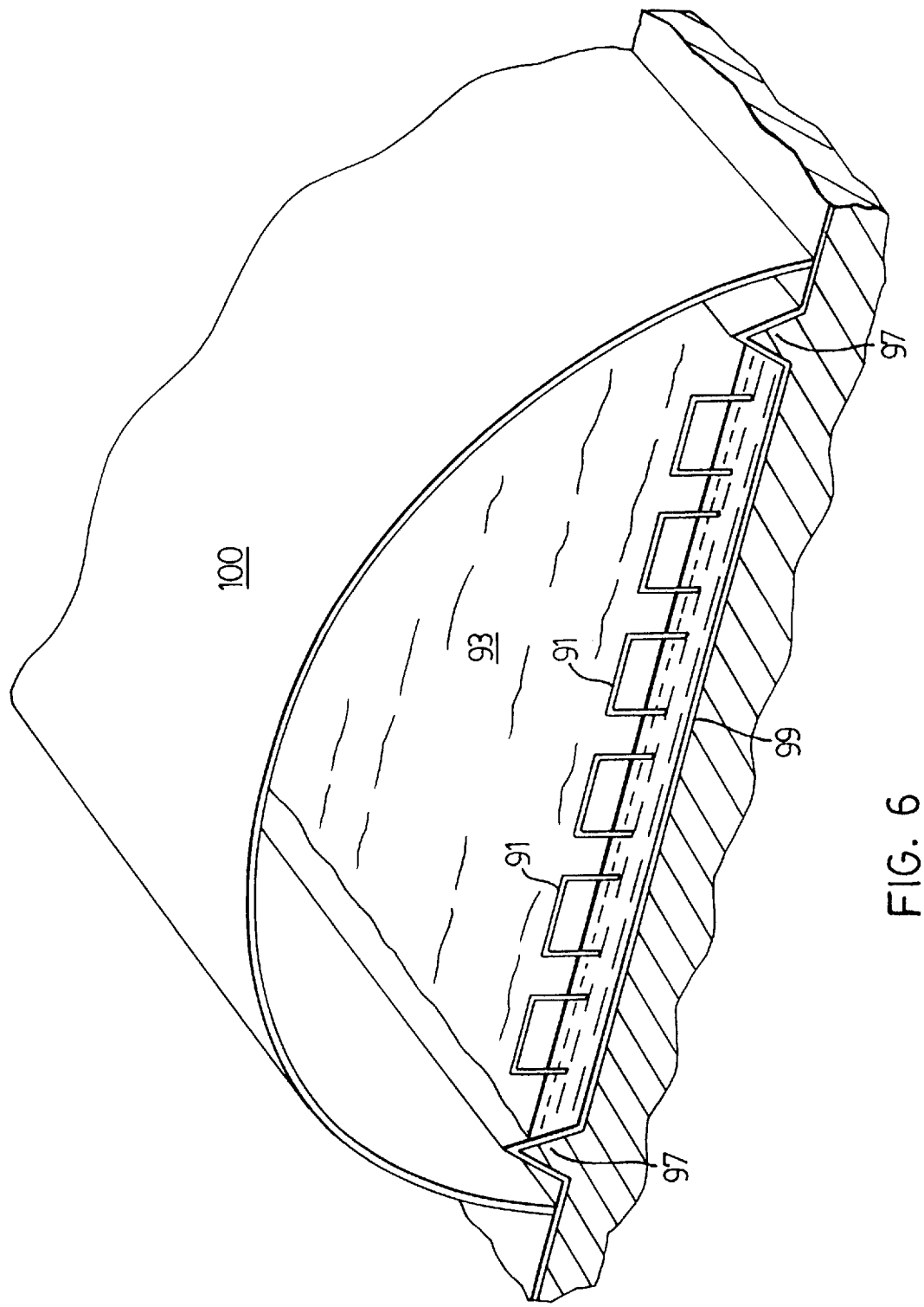
FIG. 6 is a schematic representation of one aspect of yet another embodiment of the present invention.

That portion of melt water generated by the method of the present invention which is unsatisfactory for direct release to the environment may be reduced by evaporation. The melt water may be passed through an evaporation lagoon or other suitable means. In one embodiment of the present invention as shown in FIG. 6, a partially enclosed evaporation lagoon is provided to collect contaminated water. The contaminated water is further reduced in volume through evaporation whereas the concentration of contaminants in the remaining melt water in the pool is increased. With reference to FIG. 6, a pool of water 93 is contained in a lagoon defined by earthen berms 97 and a water barrier 99 to prevent leakage of contaminated water from the lagoon. Roof 100 may be provided to inhibit rain water from entering the lagoon and adding to the load on the evaporation cycle. Air flow through the body of the enclosure is encouraged to increase the rate of evaporation. To further increase the rate of evaporation, wicking means 91 may be provided to increase the effective surface area of the water exposed to flowing air currents.

Nonvolatile components such as sediments and contaminant solids may be separated from the water through continued evaporation. Solids which settle on the bottom of the lagoon may be collected and directed for treatment with other sediments remaining after water extraction.

In general, the reduced water content of the remaining solids and sediments will, in many cases, reduce the treatment costs for the contaminated solids and sediments. For example, where subsequent treatments will involve incineration, the fuel consumption necessary to incinerate contaminants found in the sediment will be significantly reduced.

The sediment block and engaged wicking means may be positioned so that the wicking means promote melt water flow downwardly and outwardly of the sediment block. If the sediment block cavities (and emplaced wicking means) are pointing generally in the outwardly and upwardly direction, the block and wicking means may be repositioned by turning them over to the desired orientation. At the same time, it is important to consider that disturbances to the thawing sediment ought to be minimized to inhibit the collapse of channels for water to flow out of the body of the sediment.

Once the sediment has completely thawed and has been substantially dewatered, the sediment container may be tipped over to dump the remaining particles into a transfer hopper or other means to transport the thawed sediment to a treatment facility.

In yet another embodiment of the present invention, the sediment block may be thawed in layers by application of localized heating sources. The sediment block will be exposed to different rates of thawing in distinct zones to promote more rapid water removal within the target zones. Alternately, the sediment block may be treated in distinct zones by cutting the block into smaller portions and subsequently sandwiching the block segments between layers of wicking materials. These methods may be particularly useful to target discreet zones within a sediment block which have high concentrations of deleterious substances. The preferential targeting may be used to selectively extract water from those areas which are not immediately adjacent to high concentrations of toxic substances. After the major portion of that first extracted portion of water (expected to contain lower levels of contamination) is removed, the remaining portions of the sediment block may be targeted for thawing so that the residual melt water flowing from the more highly contaminated zone may be separately treated for water borne contaminants.

Further and other useful modifications to the apparatus and methods disclosed herein may be made without departing from the scope of this invention. Such useful modifications will be apparent to those skilled in the art and are intended to be covered by the following claims.

I claim:

1. An apparatus for extracting water from a frozen block of marine sediment of predetermined dimensions during a thawing cycle, the block defining one or more cavities formed during a freezing cycle, and the apparatus comprising:
   (a) a perforated rigid enclosure for housing a block of marine sediment, the enclosure comprising a base wall and a second wall projecting upwardly from the base wall, wherein at least one of the walls is perforated;
   (b) one or more elongated members projecting from the base wall into the interior of the enclosure wherein each member is adapted to substantially fill a corresponding cavity in the sediment block,
   (c) wicking means adjacent the perforated wall, the wicking means being adapted to enhance extraction of melt water from the sediment block; and (d) means to remove the melt water away from the wicking means.

2. An apparatus as claimed in claim 1, the perforated enclosure having substantially the same dimensions as the sediment block.

3. An apparatus as claimed in claim 2, the elongated members are adapted to inhibit the collapse of sediment into the cavities during the thawing cycle.

4. An apparatus as claimed in claim 3 comprising a substantially sealed container means to house the perforated enclosure and sediment block and the container being adapted to collect fluids released during the thawing cycle.

5. An apparatus as claimed in claim 4, the perforated enclosure comprising means to support the floor of the perforated enclosure above a bottom wall of the sealed container thereby defining a reservoir for storing melt water released during the thawing cycle.

6. An apparatus as claimed in claim 5, the perforated wall of the enclosure comprising reinforced mesh.

7. An apparatus as claimed in claim 1, the perforated wall defining a floor of the enclosure during the thawing cycle.

8. An apparatus as claimed in claim 7, the elongated members are hollow perforated retainers, each retainer defining a channel to the exterior of the enclosure.

9. An apparatus as claimed in claim 8, comprising wicking means adapted for placement within the channel of an elongated member.

10. An apparatus for extracting a water portion from a sediment portion of a block of frozen marine sediment during a thawing step, said block of frozen marine sediment having a predetermined size and shape and defining one or more cavities, the apparatus comprising:

(a) a housing corresponding in size to the block of marine sediment adapted to receive said block of frozen marine sediment, the housing comprising at least one perforated wall;

(b) elongated retainer means projecting from the perforated wall to the interior of the housing, the retainer means being adapted to inhibit collapse of the sediment portion into said one or more cavities of the sediment block during said thawing step; and (c) a wick to remove said water portion away from said at least one perforated wall.

11. An apparatus as claimed in claim 10 wherein the elongated retainer means are hollow perforated enclosures for receiving wicking means.

12. An apparatus as claimed in claim 10 wherein the retainer means is perforated and defines a chamber to receive the wick.

13. An apparatus as claimed in claim 10 further comprising a second wick adapted to enhance removal of the water portion away from the perforated wall of the housing.

14. An apparatus as claimed in claim 13 further comprising an outer container, wherein said container defines a sealable chamber for receiving said housing and salad of frozen marine sediment.

15. A device for extracting a melt water portion from a block of frozen marine sediment having a defined shape and size during a thawing cycle, said device comprising:

(a) a rigid perforated housing configured to correspond to the shape and size of the block of frozen marine sediment and to substantially enclose said block of frozen marine sediment, said housing being adapted to inhibit collapse of a remaining sediment portion of the frozen block of marine sediment during the thawing cycle;

(b) a wick adapted to engage with the housing and remove said melt water portion away from said block of frozen marine sediment during the thawing cycle; and (c) the housing having an outlet adapted to direct said melt water to a location remote from said housing.

16. A device as claimed in claim 15, further comprising a hollow perforated retainer adapted for insertion into a cavity defined by said block of frozen marine sediment.

17. A device as claimed in claim 16 wherein said hollow retainer is adapted to receive said wick.

18. A device as claimed in claim 16 wherein said hollow retainer corresponds to the size and shape of said cavity.

19. A device as claimed in claim 15 wherein said outlet comprises a perforated wall adapted to contact a surface of said block of frozen marine sediment.

20. A device as claimed in claim 15 further comprising a sealable outer container adapted to enclose said housing.

* * * * *